Feb. 9, 1954

A. RICALO 2,668,354

SELF-SPACING REINFORCING LINGUAL BAR

Filed Feb. 21, 1952

INVENTOR.
ACACIO RICALO.
BY Howard J. Whelan.
ATTORNEY.

Patented Feb. 9, 1954

2,668,354

UNITED STATES PATENT OFFICE 2,668,354

SELF-SPACING REINFORCING LINGUAL BAR

Acacio Ricalo, Baltimore, Md.

Application February 21, 1952, Serial No. 272,859

1 Claim. (Cl. 32—7)

This invention relates to mounting artificial teeth and more particularly to a plate for supporting same.

Under present practice it is a difficult and time consuming operation for a dentist to make a partial plate for supporting the artificial teeth to be mounted thereon when some of the natural teeth remain in the gums. Impressions are usually taken of the remaining teeth and gums and a model is made from the impression. To give the plate strength a reinforcing member composed of many small pieces of metal are placed on the model of the gums and around the existing teeth and the small pieces are then welded or brazed together to form one piece. This operation of welding the small pieces together is time consuming and costly, and if done by a dentist who is not up on welding or brazing these pieces will easily break apart and cause the plate to crack and break.

To overcome the welding and brazing of the many small parts to form a reinforcing member, it is an object of this invention to provide a one piece lingual reinforcing bar that may be easily bent to suit the conditions of the mouth and to have certain portions easily removable where they align with natural teeth.

An additional object of this invention is to provide a new and improved lingual bar having prongs along one of its edges for measuring and easy removal where they coincide with the natural teeth to create a space for the tooth to project through and the remainder of the prongs for bending over the gums where the new artificial teeth are to be anchored and the plate material placed thereon.

A further object of the present invention is to provide a new and improved self spacing reinforcing member to act as a support for artificial teeth.

A further object of this invention is to provide a new and improved one piece lingual bar for the support for artificial teeth that will eliminate welding and brazing of many parts to form a single unit.

Other objects of the invention will become apparent as the invention is more fully set forth.

For a clearer understanding of the invention and the objects thereof, reference is made to the accompanying drawings, wherein a particular form of the invention is indicated. These drawings when used with the following description serve to illustrate the invention, its principles and the operation thereof, while the claim indicates the scope thereof.

In the drawings.

Similar reference characters refer to similar parts throughout the drawings.

Figure 1:
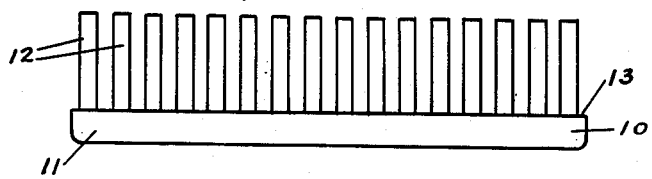
Figure 1 is the front elevation of the universal lingual bar embodying this invention.
Figure 2:
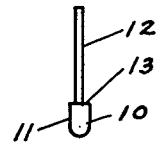
Figure 2 is an end elevation of Figure 1.
Figure 3:
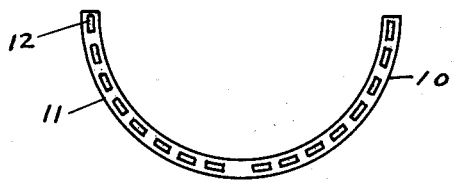
Figure 3 is a plan view of Figure 1 after it is curved to fit the gum of the patient.
Figure 4:
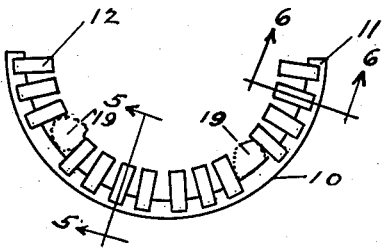
Figure 4 is a view similar to Figure 3 showing some of the prongs removed to allow the natural teeth to project through the bar, and having the remaining prongs bent over the gums.
Figure 5:
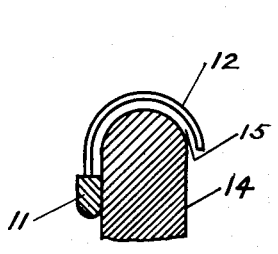
Figure 5 is a sectional view taken along line 5—5 of Figure 4.
Figure 6:
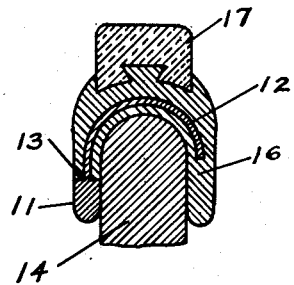
Figure 6 is a sectional view taken along line 6—6 of Figure 4 showing a tooth mounted in plastic covering material and attached to the lingual bar.
Figure 7:
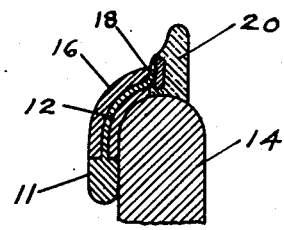
Figure 7 shows the lingual bar with one prong bent upwardly to support a tooth.
Figure 8:
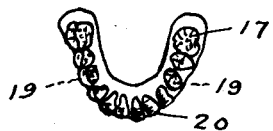
Figure 8 is a plan view of a partial plate with the false teeth mounted thereon.

In the construction shown in the drawings a one piece universal lingual reinforcing bar 10 is provided with a base 11 of heavier construction than the prongs 12 that extend from its upper face 13. The lingual bar is usually made of flat stainless steel or other noncorrodible material, preferably in the form shown in Figures 1 and 2. It is then curved to fit the model 14 made to correspond with the patient's gum and assumes a shape similar to that shown in Figure 3. The prongs are shown upright. The prongs 12 are then bent over the model 14 as shown in Figure 4 and the prongs removed where they contact the natural teeth. In Figure 5 the prongs are shown bent over the model 14 but spaced away from it as noted at 15 so the plastic or other materials 16 used to encase the universal lingual reinforcing bar will prevent the prongs from contacting the gums of the user. The plastic or other material is of conventional formula and is used in the conventional manner to anchor the artificial teeth 17 and lingual bar 10 into a complete structure. In the modification shown in Figure 7, the end 18 of the prong 12 is bent upward and forms a support for an artificial tooth 20; the bar and its prongs are then encased in the plastic material 16 in the conventional manner. In use, the partial plate is slid over the natural teeth 19 in the usual manner.

While but one general form of the invention is shown in the drawings and described in the specification, it is not desired to limit this application for patent to this particular form as it is appreciated that other forms of construction could be made that would use the same principles and come within the scope of the appended claim.

Having thus described the invention, what is claimed is:

A self spacing reinforcing lingual bar for use in supporting false teeth comprising in combination a base, spaced prongs of less width than the base projecting from said base, whereby flat shoulders are formed on said base extending from each side of said prongs to the outer sides of said base.

ACACIO RICALO.

References Cited in the file of this patent

UNITED STATES PATENTS

| Number | Name | Date |
| --- | --- | --- |
| 1,435,909 | Arata | Nov. 21, 1922 |
| 1,599,361 | Henderson | Sept. 7, 1926 |
| 1,704,856 | Hallowell | Mar. 12, 1929 |